US006632554B2

(12) United States Patent
Doshi et al.

(10) Patent No.: US 6,632,554 B2
(45) Date of Patent: Oct. 14, 2003

(54) HIGH PERFORMANCE CATHODES FOR SOLID OXIDE FUEL CELLS

(75) Inventors: Rajiv Doshi, Torrance, CA (US); Jie Guan, Torrance, CA (US); Nguyen Minh, Fountain Valley, CA (US); Kurtis Montgomery, Torrance, CA (US); Estela Ong, Chicago, IL (US); Gregory Lear, Redondo Beach, CA (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 233 days.

(21) Appl. No.: 09/832,625

(22) Filed: Apr. 10, 2001

(65) Prior Publication Data

US 2002/0177031 A1 Nov. 28, 2002

(51) Int. Cl.$^7$ ............................ H01M 4/00; H01M 8/10

(52) U.S. Cl. ............................ 429/30; 429/27; 429/31; 429/32

(58) Field of Search ............................ 429/27, 30, 31, 429/32

(56) References Cited

U.S. PATENT DOCUMENTS 4,861,345 A * 8/1989 Bowker et al. ............ 29/623.1
4,913,982 A 4/1990 Kotchick et al.
4,938,571 A 7/1990 Cogan et al.
4,948,680 A 8/1990 Madou et al.
5,035,961 A 7/1991 Riley
5,069,987 A * 12/1991 Gordon ....................... 429/31
5,171,645 A 12/1992 Khandkar
5,286,322 A 2/1994 Armstrong et al.
5,306,411 A 4/1994 Mazanec et al.
5,403,461 A * 4/1995 Tuller et al. ................ 204/252
5,516,597 A * 5/1996 Singh et al. .................. 429/30
5,686,198 A * 11/1997 Kuo et al. ..................... 429/30
5,712,055 A 1/1998 Khandkar et al.
5,741,406 A 4/1998 Barnett et al.
5,750,279 A * 5/1998 Carolan et al. ............... 429/32
5,753,385 A 5/1998 Jankowski et al.
5,922,486 A 7/1999 Chiao
5,932,368 A 8/1999 Batawi et al.
5,985,476 A * 11/1999 Wachsman et al. ........... 429/33
5,993,986 A * 11/1999 Wallin et al. ................. 429/32
5,993,989 A 11/1999 Baozhen et al.
6,007,683 A 12/1999 Jankowski et al.
6,117,582 A * 9/2000 Wallin et al. ................. 429/45
6,399,233 B1 * 6/2002 Milliken et al. .............. 429/30
6,420,064 B1 * 7/2002 Ghosh et al. ................. 429/40

OTHER PUBLICATIONS

De Souza et al., *YSZ–Thin–Film Electrolyte for Low–Temperature Solid Oxide Fuel Cell*, Proc. 2$^{nd}$ Euro. SOFC Forum, 2, 677–685 (1996).

(List continued on next page.)

*Primary Examiner*—Randy Gulakowski
*Assistant Examiner*—Donald V. Scaltrito
(74) *Attorney, Agent, or Firm*—Sutherland Ashill & Brennan LLP

(57) ABSTRACT

The present invention relates to a multi-layered and multi-functional cathode in solid oxide fuel cells having high conductivity, high catalytic activity, minimized coefficient of thermal expansion (CTE) mismatch, excellent compatibility to other portions of the fuel cell, and reduced temperature operation. The cathode comprises a conductive layer, a catalyst layer and a graded composition layer. The conductive layer has a first density, the catalyst layer has a second density that is less than the first density, and the graded composition layer is characterized by a graded electronic conductivity and a graded ionic conductivity.

30 Claims, 1 Drawing Sheet

13 24 22 23 21 20 12

OTHER PUBLICATIONS

De Souza et al., *Thin–film solid oxide fuel cell with high performance at low–temperature*, Solid State Ionics, 98, 57–61 (1997).
Doshi et al., *Development of Solid–Oxide Fuel Cells That Operate at 500° C.*, J. Electrochem. Soc., 146 (4), 1273–1278 (1999).
Ishihara et al., *Doped $PrMnO_3$ Perovskite Oxide as new Cathode of Solid Oxide Fuel Cells for Low Temperature Operation*, J. Electrochem. Cos., 142 (5), p. 1519 (1995).
Kim et al., *Polarization Effects in Intemediate Temperature, Anode–Supported Solid Oxide Fuel Cells*, J. Electrochem. Soc., 146 (1), 69–78 (1999).
Kindermann et. al., *Chemical Interactions between La–Sr–Mn–Fe–O–Based Perovskites and Yttria–Stabilized Zirconia*, J. Am. Ceram. Soc., 80[4] 909–914 (1997).
Krist et al., *Cost Projection for Planar Solid Oxide Fuel Cell Systems*, 1996 Fuel Cell Seminar Abstracts, p. 497 (1996).
Ma et al., *Electrical Transport Properties and Defect Structure of $SrFeCo_{0.5}O_x$*, J. Electrochem. Soc., 143, p. 1736 (1996).
Minh, *Ceramic Fuel Cells*, J. Am. Ceram. Soc., 76 [3], 563–88 (1993).
Minh, *Development of Thin–Film Solid Oxide Fuel Cells for Power–Generation Applications*, Proc. $4^{th}$ Int'l Symp. On SOFCs, 138–145 (1995).
Minh, *High–performance reduced–temperature SOFC technology*, Int'l Newsletter Fuel Cell Bulletin, No. 6, 9–11 (1999).
Steele et. al., *Properties of La0.6Sr0.4Co0.2Fe0.8O3–x (LSCF) Double layer cathodes on gadolinium–doped cerium oxide (CGO) electrolytes II. Role of oxygen exchange and diffusion*, Solid St. Ionics, 106, 255 (1998).
Steele, *Survey of Materials Selection for Ceramic Fuel Cells II. Cathode and Anode*, Solid State Ionics, 86–88, p. 1223 (1996).
Uchida et al., *Effect of Ionic Conductivity of Zirconia Electrolytes on the Polarization Behavior of Various Cathodes in Solid Oxide Fuel Cells*, J. Electrochem. Soc., 146, 1, p. 1–7, (1999).
Visco et. al., *Fabrication and performance of Thin–Film SOFCs*, Proc. $5^{th}$ Int'l Symposium on SOFCs, 710 (1997).
Wang et. al., *Lowering the Air–Electrode interfacial Resistance in Medium–Temperature Solid Oxide Fuel Cells*, J. Electrochem. Soc., 139 (10), L8 (1992).
Widmer et al., *The Influence of Process Conditions on the Performance of a Cell Containing Catalytic Domains*, Proc. $1^{st}$ Euro. SOFC Forum, p. 681 (1994).
Yamamoto et al., *Perovskite–Type Oxides as Oxygen Electrodes for High Temperature Oxide Fuel Cells*, Solid State Ionics, 22, p. 241 (1987).

* cited by examiner

HIGH PERFORMANCE CATHODES FOR SOLID OXIDE FUEL CELLS

BACKGROUND OF THE INVENTION

The present invention generally relates to cathodes for solid oxide fuel cells (SOFCs) and, more particularly, to a multi-layered, multifunctional cathode having high conductivity, high catalytic activity, minimized coefficient of thermal expansion (CTE) mismatch, excellent compatibility to other portions of the fuel cell, and reduced temperature operation.

A solid oxide fuel cell is an energy conversion device that produces direct-current electricity by electrochemically reacting a gaseous fuel (e.g., hydrogen) with an oxidant (e.g., oxygen) across an oxide electrolyte. The key features of current SOFC technology include all solid-state construction, multi-fuel capability, and high-temperature operation. Because of these features, the SOFC has the potential to be a high-performance, clean and efficient power source and has been under development for a variety of power generation applications.

Under typical operating conditions, an SOFC single cell produces less than 1V. Thus, for practical applications, single cells are stacked in electrical series to build voltage. Stacking is provided by a component, referred to as an interconnect, that electrically connects the anode of one cell to the cathode of the next cell in a stack. Conventional SOFCs are operated at about 1000° C. and ambient pressure.

A SOFC single cell is a ceramic tri-layer consisting of an oxide electrolyte sandwiched between an anode and a cathode. The conventional SOFC materials are yttria-stabilized zirconia (YSZ) for the electrolyte, strontium-doped doped lanthanum manganite (LSM) for the cathode, nickel/YSZ for the anode, and doped lanthanum chromite for the interconnect. Currently, there are two basic cell constructions for SOFCs: electrolyte-supported and electrode-supported.

In an electrolyte-supported cell, the electrolyte is the mechanical support structure of the cell, with a thickness typically between 150 and 250 $\mu$m. Electrolyte-supported cells are used, for example, in certain planar SOFC designs. In an electrode-supported cell, one of the electrodes (i.e., the anode or cathode) is the support structure. The electrolyte is a thin film (not greater than 50 $\mu$m) that is formed on the support electrode. Tubular, segmented-cells-in-electrical-series, and certain planar SOFC designs, employ this type of cell.

Conventional YSZ-based SOFCs typically employ electrolytes thicker than 50 $\mu$m and require an operating temperature of 1000° C. to minimize electrolyte ohmic losses. The high-temperature operation imposes stringent material and processing requirements to the fuel cell system. Thus, the recent trend in the development of SOFCs is to reduce the operating temperature below 800° C. The advantages of reduced temperature operation for the SOFC include a wider choice of materials, longer cell life, reduced thermal stress, improved reliability, and potentially reduced fuel cell cost. Another important advantage of reduced temperature operation is the possibility of using low-cost metals for the interconnect.

Data and information in the literature indicate that SOFC cells can be further developed and optimized to achieve high power densities and high performance at reduced temperature. The electrolyte and cathode have been identified as barriers to achieving efficiency at reduced operating temperatures due to their significant performance losses in current cell materials and configurations.

Various attempts have been made to reduce the operating temperature of YSZ-based SOFCs while maintaining operating efficiency. With YSZ electrolyte-supported cells, the conductivity of YSZ requires an operating temperature of about 1000° C. for efficient operation. For example, at about 1000° C. for an YSZ electrolyte thickness of about 150 $\mu$m and about a 1 $cm^2$ area, the resistance of the electrolyte is about 0.15 ohm based on a conductivity of about 0.1 S/cm. The area-specific resistance (ASR) of the electrolyte is, therefore, about 0.15 ohm-$cm^2$. For efficient operation, a high-performance cell with an ASR of about 0.05 ohm-$cm^2$ is desired. To achieve an ASR of about 0.05 ohm-$cm^2$ at reduced temperature operation (for example, 800° C.), the required thickness (i.e., 15 $\mu$m) of YSZ can be calculated. If the desired operating temperature is less than 800° C., while the ASR remains the same, either the thickness of YSZ must be further reduced or highly conductive alternate electrolyte materials must be used.

Various methods have been evaluated for making cells with thin films (about 5 to 25 $\mu$m thick). Electrode-supported cells (specifically, anode-supported cells) with thin electrolyte films have been shown high performance at reduced temperatures. Power densities over 1 W/$cm^2$ at 800° C. have been reported, for example, in de Souza et al., *YSZ-Thin-Film Electrolyte for Low-Temperature Solid Oxide Fuel Cell,* Proc. $2^{nd}$ Euro. SOFC Forum, 2, 677–685 (1996); de Souza et al., *Thin-film solid oxide fuel cell with high performance at low-temperature,* Solid State Ionics, 98, 57–61 (1997); Kim et al., *Polarization Effects in Intermediate Temperature, Anode-Supported Solid Oxide Fuel Cells,* J. Electrochem. Soc., 146 (1), 69–78 (1999); Minh, *Development of Thin-Film Solid Oxide Fuel Cells for Power-Generation Applications,* Proc. $4^{th}$ Int'l Symp. On SOFCs, 138–145 (1995); Minh et al., *High-performance reduced-temperature SOFC technology,* Int'l Newsletter Fuel Cell Bulletin, No. 6, 9–11 (1999). An alternative attempt at reducing operating temperature has involved the use of alternate solid electrolyte materials with ionic conductivity higher than YSZ, as described in Minh, *Ceramic Fuel Cells,* J. Am. Ceram. Soc., 76 [3], 563–88 (1993). However, the work on alternate electrolyte materials is still at a very early stage.

The other barrier to achieve efficiency at reduced temperature is the cathode 13. LSM-based cathodes have been used in high-temperature (>900° C.) SOFCs as either a porous structure of sintered LSM particles or as LSM/YSZ mixtures. For operation at reduced temperatures (e.g., 700 to 900° C.), optimization of the mixtures of LSM and YSZ in the cathode has resulted in a cathode ASR of 0.2 to 0.3 ohm-$cm^2$ at 800° C. For thin-film electrode-supported cells, the total cell ASR is typically less than 0.4 ohm-$cm^2$. The performance and losses from each of the cell components of a typical thin-film YSZ electrolyte with an Ni/YSZ anode-support electrode and with an optimized LSM/YSZ cathode are showed in FIG. 1. As seen in the figure, the loss from the cathode contributes to the majority of the total cell performance loss. When the cell operating temperature is decreased, the cell ASR increases significantly due to an increase in both electrolyte resistance and cathode polarization.

Recently, there have been attempts to increase performance at reduced operating temperatures by developing new cathode materials in combination with new and higher-conductivity electrolytes. These cathode materials are typically designed to overcome the limitations from LSM's oxide ion conductivity described in Steele, *Survey of Materials Selection for Ceramic Fuel Cells II. Cathode and*

*Anode,* Solid State Ionics, 86–88, p. 1223 (1996), the rate of oxygen exchange reaction on the LSM surface, and the moderate electronic conductivity of LSM. One approach involves the development of Ag/yttria-doped bismuth oxide (YDB) cermet cathodes for doped ceria ($CeO_2$) electrolytes. The combination of high oxide ion conductivity of YDB and high electronic conductivity of Ag yielded some enhancement in performance between 500 and 700° C. as discussed in Doshi et. al., *Development of Solid-Oxide Fuel Cells That Operate at* 500° C., J. Electrochem. Soc., 146 (4), 1273–1278 (1999), and Wang et. al., *Lowering the Air-Electrode Interfacial Resistance in Medium-Temperature Solid Oxide Fuel Cells,* J. Electrochem. Soc., 139 (10), L8 (1992). However, YDB is not suitable for use above 700° C. as it reacts with ceria. In addition, Ag tends to densify above 700° C., thus decreasing porosity for gas access.

Another approach has involved the development of a single material with the combination of desirable properties mentioned above. For example, some materials in the La—Sr—Fe—Co—O system, such as $La_{0.6}Sr_{0.4}Fe_{0.8}Co_{0.2}O_3$ (LSCF) and $La_{0.6}Sr_{0.4}CoO_3$ (LSC), possess much higher ionic and electronic conductivity compared to LSM. Preliminary data on the use of such materials with ceria and (Sr- and Mg-doped $LaGaO_3$) LSGM electrolytes, which is published in Doshi et. al., *Development of Solid-Oxide Fuel Cells That Operate at* 500° C., J. Electrochem. Soc., 146 (4), 1273–1278 (1999), and Steele et. al., *Properties of La0.6Sr0.4Co0.2Fe0.8O3-x* (LSCF) *double layer cathodes on gadolinium-doped cerium oxide* (*CGO*) *electrolytes II. Role of oxygen exchange and diffusion*, Solid St. Ionics, 106, 255 (1998), show some improvement.

Attempts to dope a LSC cathode with a small amount of Ni resulted in a cell peak power density of 400 $mw/cm^2$ at 650° C. as described in Visco et. al., *Fabrication and Performance of Thin-Film SOFCs,* Proc. 5th Int'l Symposium on SOFCs, 710 (1997), implying a cathode ASR of no more than 0.4 ohm-$cm^2$ at 650° C. The limitations of these materials include high reactivity with YSZ at temperatures above 800° C. (discussed in Kindermann et. al., *Chemical Interactions between La—Sr—Mn—Fe—O—Based Perovskites and Yttria-Stabilized Zirconia,* J. Am. Ceram. Soc., 80[4]909–914 (1997)) and high CTE (depending on Co content) compared to available electrolytes. LSC has a CTE of almost $23\times10^{-6}$ in./in./° C. and LSCF has a CTE of about $14\times10^{-6}$ in./in./° C.

Other efforts involve development of low-temperature electrodes for oxygen generation. However, many of those materials may not be suitable for SOFC applications. For example, materials termed BICUVOX, which are made from the Bi—Cu—V—O family, have high oxygen conductivity in certain directions of the molecular structure but are highly reactive and less stable than desired for SOFC applications.

The fabrication process that the above materials undergo is an important factor that affects the performance of a fuel cell. Several techniques are available to manufacture cells in either of the two classes of cell construction (i.e. electrolyte-supported and electrode-supported), including thick-film electrolytes and thin-film electrolytes.

For thick-film electrolytes, tape casting is typically used to fabricate these dense membranes. During tape casting, a slurry of fine ceramic particles dispersed in a fluid vehicle is cast as a thin tape on a carrier substrate using a doctor blade. The tape is then dried, removed from the carrier substrate, and fired to produce a dense substrate. After sintering, deposition techniques such as hand painting, screen-printing, or spray coating are used to attach electrodes to both sides. The high ohmic resistance of the thick electrolyte necessitates higher operating temperatures of around 1000° C. to reduce the ohmic polarization losses due to the electrolyte.

Driven by the benefits of reducing ohmic loss in the electrolyte at lower temperatures (i.e., 550 to 800° C.), SOFC development efforts have focused attention on "thin-film electrolytes" (i.e., 5 to 25 μm) supported on thick electrodes, such as described in U.S. Pat. No. 5,741,406. A number of selected fabrication processes used for making SOFCs, especially thin YSZ electrolytes, are listed in Table 1.

TABLE 1

| Process | Description |
|---|---|
| Spray Pyrolysis | A solution consisting of powder precursor and/or particles of the final composition is sprayed onto a hot substrate (400 to 600° C.), followed by a sintering step to densify the layer. |
| Plasma Spraying | A plasma containing fine ceramic particles is projected with a high speed towards a substrate to deposit a thin layer. |
| CVD/EVD | A dense layer of electron or ion-conducting oxide is deposited on a porous substrate by a chemical vapor deposition (CVD)/electrochemical vapor deposition (EVD) process. |
| Sputtering | An electrical discharge in argon/oxygen mixture is used to deposit materials on substrates. |
| Spin Coating | A sol gel precursor is applied to a spinning substrate surface. Heat treatment of the coating at relatively low temperatures (~600° C.) produces a dense, homogenous, thin layer (0.2 to 2 μm). |
| Dip Coating | Porous substrates are immersed in YSZ slurries of colloidal-sized particles. Deposited layers are then dried and fired. |
| Electrophoretic Deposition | YSZ powder particles are deposited from a suspension onto a substrate electrode of opposite charge when a DC electrical field is applied. Numerous coating/firing cycles are required to produce a fully dense, 5 μm layer. |
| Tape Calendering | Plastic forming process involving squeezing a softened thermo-plastic polymer/ceramic powder mixture between two rollers to produce a continuous sheet of material. |

Other thin-film techniques investigated for SOFC applications include vapor-phase electrolytic deposition, vacuum evaporation, liquid-injection plasma spraying, laser spraying, jet vapor deposition, transfer printing, coat mix process, sedimentation method, electrostatic spray pyrolysis, and plasma metal organic chemical vapor deposition. Additional related references are found in U.S. Pat. Nos. 5,922,486; 5,712,055; and 5,306,411.

As can be seen, there is a need for an SOFC fabrication process that ensures that no condition or environment in any process step destroys the desired characteristics of any of the materials. Another need is for electrode properties which provide increased performance in the 550 to 800° C. range while maintaining function integrity up to 1000° C. for short periods. One goal is to achieve a cell power density of about 1 $W/cm^2$ at about 600° C., as well as a cathode ASR that is less than 0.35 ohm-$cm^2$ at such temperature. Based on the performance of current optimized LSM/YSZ cathodes (>1.5 ohm-$cm^2$ at 600° C.), a significant increase in performance is required. New cathodes with improved properties must be employed in conjunction with the electrolyte to create a compatible system of fuel cell components. Some of the improvements should include increased catalytic activity for oxygen reduction reaction, increased ionic conductivity near the interface, and electronic conductivity at the electrode surface.

SUMMARY OF THE INVENTION

The cathode of the present invention provides a high-performance, reduced-temperature SOFC. The cathode is based on materials and structures which, when combined, are capable of increased performance in about the 550° to 800° C. operating range while maintaining functional integrity up to about 1000° C. The materials and fabrication processes are economical, scalable, and amenable to high-volume manufacture of fuel cells.

The cathode of the present invention for SOFCs is preferably multi-layered and multifunctional, having high conductivity (about 100 to 5000 S/cm), high catalytic activity, minimized coefficient of thermal expansion (CTE) mismatch, excellent compatibility to other portions of the fuel cell, such as electrolyte and interconnect, and can operate at reduced temperatures. The cathode will allow efficient operation at temperatures between 550 ° to 800° C. rather than the conventional 1000° C. The low operating temperature range will enable material selections that are more economical and possess desired characteristics.

In one aspect of the present invention, a solid oxide fuel cell comprises an anode, an electrolyte adjacent to the anode, and a cathode adjacent to the electrolyte, with the cathode having a conductive layer adjacent the electrolyte.

In a further aspect of the present invention, a cathode in a solid oxide fuel cell comprises a conductive layer having a first density, a catalyst layer having a second density that is less than the first density, and a graded composition layer characterized by a graded electronic conductivity and a graded ionic conductivity.

In another aspect of the present invention, a method of making a cathode for a solid oxide fuel cell comprises producing a conductive layer having a first density and producing a catalyst layer having a second density that is less than the first density, with the catalyst layer being adjacent the conductive layer.

Yet in another aspect of the present invention, a method of making a cathode for a solid oxide fuel cell further comprises producing a graded electronic conductivity in a graded composition layer adjacent a catalyst layer and producing a graded ionic conductivity in the graded composition layer adjacent the catalyst layer.

These and other features, aspects and advantages of the present invention will become better understood with reference to the following drawings, description and claims.

DETAILED DESCRIPTION OF THE INVENTION

The present invention may be utilized in a conventional solid oxide fuel cell comprising an anode, an electrolyte adjacent the anode, and a cathode adjacent the electrolyte. The electrolyte is sandwiched between the anode and the cathode. The anode can be of any well-known design, such as that described in U.S. Pat. No. 5,286,322 and incorporated herein by reference. In particular, the anode may be comprised of an anode electrolyte compound that provides ionic conduction and an anode electronic conducting material that provides electronic conduction and catalytic activity. As examples, the anode electrolyte compound can include doped zirconia, doped ceria and gallate-based oxides. Dopants for zirconia can include scandium, ytrrium, other rare earths and Group II elements such as Ca, Sr, Mg, and Ba or oxides of all of the above. Examples of useful anode electronic conducting materials include transition metals and electronic conducting oxides. Some preferred transition metals include Ni, Co, Cr, Cu and Fe. Useful electronic conducting oxides include perovskite oxides with the formula $ABO_{3\pm d}$ where A is a rare earth element or a combination of rare earth and smaller amounts of a dopant, B is a transition metal or a combination of transition metal with smaller amounts of a dopant, and d is greater than or equal to 0. Other useful structures are brownmillerites based on $A_2B_2O_{5\pm d}$ and pyrochlores based on $C_2D_2O_{7\pm d}$ (where C is one or more of rare earth metals—Ca, Sr, Mg, Ba, Y, Pb, and Bi; D is one or more tetravalent ions such as Ru, Ti, Zr, and Ce) with stability in the fuel atmosphere.

Figure 1:
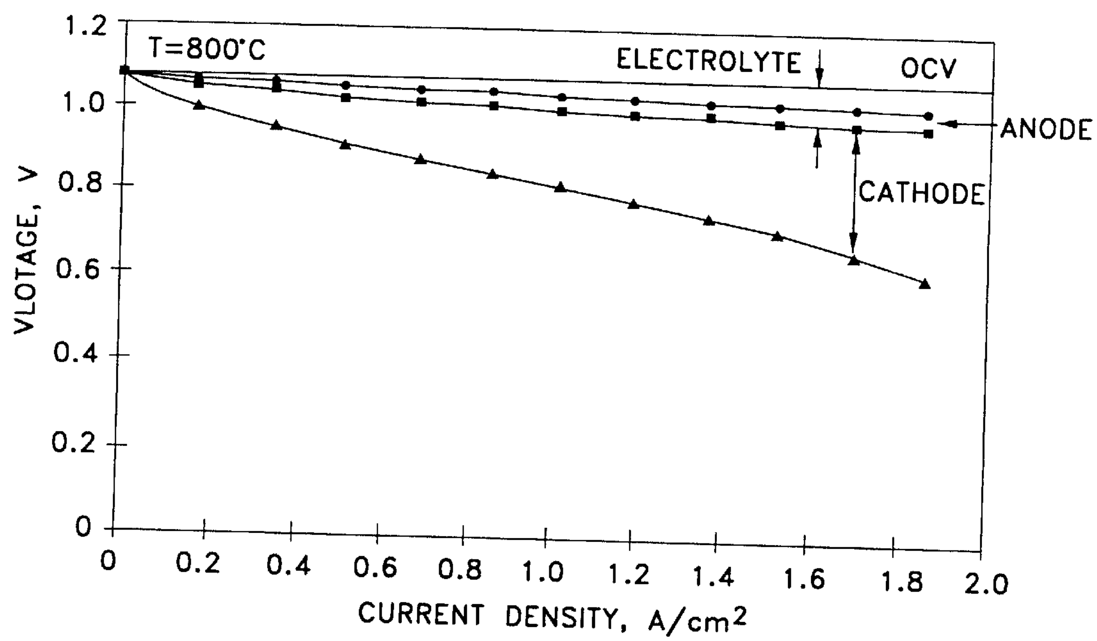
FIG. 1 is a graph of voltage versus current density for a prior art solid oxide fuel cell.
Figure 2:
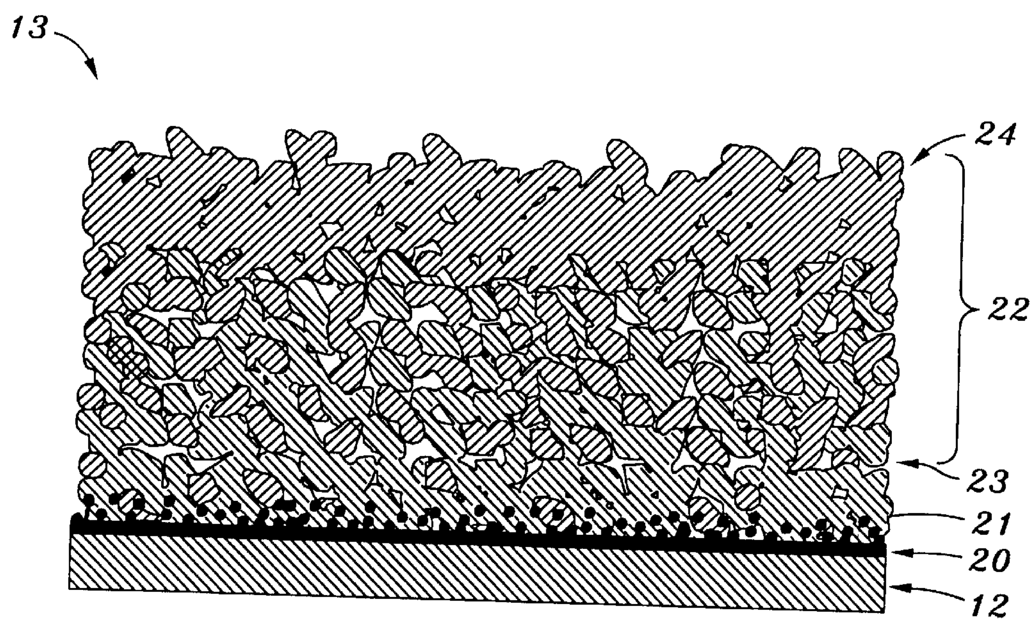
FIG. 2 is a schematic cross section of a cathode structure according to an embodiment of the present invention.

In FIG. 2, the electrolyte 12 may be a thin-film, single or multi-layer structure. As an example, the electrolyte 12 may be of conventional design such as that shown in U.S. Pat. No. 5,741,406 and incorporated herein by reference. More specifically, the electrolyte 12 may be comprised of at least one transition metal reactive compound. In other words, the electrolyte 12 may be comprised of a compound that is normally chemically reactive with a transition metal that might exist, for example, in the anode. The transition metal reactive compound can be, as an example, a gallate compound having gallium and a rare earth metal. The rare earth metal is preferably characterized by an atomic number between about 57 to 71. Specific examples of gallate compounds that can be used in practicing the present invention include $LaGaO_{3-d}$, $ErGaO_{3-d}$, $PrGaO_{3-d}$, and $DyGaO_{3-d}$ where d is greater than or equal to zero and doped variations with the formula $Ln_{1-x}M_xGa_{1-y}M'_yO_{3-d}$ (where Ln is a rare earth; M and M' are selected from Ca, Mg, Sr, Ba; and x and y are between the values 0 and 0.5).

In the present invention, a cathode 13 may be particularly useful for about 550 to 800° C. operation in a solid oxide fuel cell. The cathode 13 achieves the below mentioned advantages more preferably at about 500 to 800° C. operation. The cathode 13 is characterized by an area-specific resistance (ASR) between about 2 to 0.05 ohm-cm$^2$ at about 500 to 800° C. and, more specifically, not greater than about 0.35 ohm-cm$^2$ at about 600° C. The high performance cathode 13 preferably incorporates particular materials and a number of functional layers for increased oxide ion conductivity (about 0.01 to 10 S/cm at 600° C.) in active cathode areas, increased oxygen reduction reaction rates on the cathode 13 surface, high electronic conductivity (about 100 to 2000 S/cm at 600° C.), and compatibility with the electrolyte.

In the preferred embodiment of FIG. 2, the cathode 13 may comprise a conductive layer 20 adjacent the electrolyte 12, an optional catalyst layer 21 adjacent the conductive layer 20, and an optional graded composition layer 22 adjacent the catalyst layer 21. The catalyst layer 21 is disposed between the conductive layer 20 and the graded composition layer 22. As with the anode (not shown), the materials used in the cathode 13 provide ionic conduction, electronic conduction, and catalytic activity to the cathode 13.

The conductive layer 20, which is immediately adjacent to the electrolyte 12, provides electrons traveling from the graded composition layer 22 into the electrolyte layer 12 and, at the same time, permits oxygen ion traveling from the graded composition layer 22 into the electrolyte layer 12.

The conductive layer 20 may preferably be constructed as a dense thin-film (<1 $\mu$m) having a first density greater than about 80% of theoretical. It can have a typical thickness between about 0.1 to 0.2 $\mu$m, although the thickness can vary for the particular application. The rationale of the conductive layer 20 being a dense thin-film with the materials mentioned below is that the activity of the cathode 13 material is sufficient in terms of catalytic activity and a reduction in thickness decreases the path the oxide ions have to travel through the conductive layer 20.

The conductive layer 20 may comprise a conductive material having a perovskite, brownmillerite, or pyrochlore structure. More particularly, the conductive material may be selected from $ABO_{3\pm d}$, $A_2B_2O_{5\pm d}$, and $C_2D_2O_{7\pm d}$ wherein A is one or more of rare earth metals, Ca, Sr, Mg, and Ba; B is a transition metal; C is one or more of rare earth metals—Ca, Sr, Mg, Ba, Y, Pb, and Bi; D is one or more tetravalent ions such as Ru, Ti, Zr, and Ce; and d is a number from 0 to 1. Examples of $ABO_{3\pm d}$ include $La_{0.5}Sr_{0.5}CoO_3$ (LSC) which has a very high electronic conductivity (i.e., more than an order of magnitude higher than LSM). LSCF, derived from partial substitution of Fe in place of Co, has conductivities that are between LSM and LSC. Modifications of the perovskite compositions could also include substitution of La by other lanthanides—e.g., Pr or Sm. Such substitutions affect the reactivity of the materials with YSZ and typically decrease as the size of the lanthanide increases. In high-temperature SOFCs (800 to 1000° C.), substituting with Pr for La can increase performance. A possible reason may be that Pr can exist in more than one valence state in the perovskite, whereas La is trivalent only. In a variant to the above approach, replacing part of the Mn with Co, because the Co containing perovskites exhibit more desirable properties, could change the composition of LSM.

Some useful examples of $A_2B_2O_{5\pm d}$ (also written as $ABO_{2.5\pm d}$) include $SrFeCo_{0.5}O_{2.5\pm d}$ that has a high oxide ion conductivity above 500° C., along with moderate electronic conductivity. Other variations include substitution of Sr with Bi such as $Sr_{0.25}Bi_{0.5}FeO_{2.5\pm d}$ and variation of the Fe to Co ratios such as $SrFe_{1-x}Co_xO_{2.5\pm d}$ where x is a number from 0 to 0.5. Pyrochlore structures offer properties similar to perovskites, but allow the incorporation of tetravalent ions. For example, in $Y_{2-x}Ca_xRu_2O_{7\pm d}$ (also written as $CDO_{3.5\pm d}$), the highly catalytic $Ru^{4+}$ ion can be incorporated into this structure. The ionic conductivity would be provided by the creation of oxygen vacancies due to partial Ca substitution for Y. Other useful examples of $C_2D_2O_{7\pm d}$ include $Pb_2Ru_2O_7$, $Bi_2Ru_2O_7$, and $Y_{2-x}Ca_xCe_2O_7$.

The above conductive materials may have differences in CTE compared to the electrolyte—e.g., LSC has a very high CTE (>$20\times10^{-6}$ in./in./° C.), whereas LSCF has a moderately high CTE (about $14\times10^{-6}$ in./in./° C.). Both are compatible with ceria and LSGM but react with YSZ. The CTE difference could be abated by selecting appropriate substitutions in the conductive material and also by the addition of an electrolyte phase, such as ceria and LSGM to form a composite similar to that of LSM/YSZ to minimize CTE difference. The addition of an electrolyte phase may also form physical interconnected networks of the electrolyte material, electronic conducting material and porosity.

Immediately adjacent to the conductive layer 20 is the catalyst layer 21. The catalyst layer 21 is preferably constructed with a second density that is less than about 75% of theoretical and has a typical thickness between about 1 to 2 $\mu$m. The catalyst layer 21 preferably comprises a first catalyst material selected from $ABO_{3\pm d}$, $A_2B_2O_{5\pm d}$, and $C_2D_2O_{7\pm d}$ as outlined above. The catalyst layer 21 also comprises a second catalyst material selected from Pt, Pd, Ru, Rh, and transition metal ions. Like the conductive layer 20, the selected first catalyst material in the catalyst layer 21 permits oxygen ion travel from the graded composition layer 22 into the electrolyte layer 12 adjacent said conductive layer 20. The oxide ion conductivity can be increased by the creation of oxygen vacancies due to partial element substitution in the first catalyst materials. The catalyst layer 21 also causes reduction of oxygen from the gas phase. The oxygen reduction reaction is a reaction that produces oxide ions from oxygen molecules. The first and second catalyst particles are both active for oxygen reduction; however, the first particles are also capable of oxide ion conduction whereas the second catalyst material has a higher activity than the first but does not have the ability for oxide ion conduction through it. The term "active" refers to catalyst particles of the catalyst layer 21 where a significant amount of oxygen reduction reactions is taking place.

The catalyst layer 21 may be produced by applying on the conductive layer 20 dispersed active catalyst particles mixed with the first catalyst materials mentioned above. The mixture can be applied by spraying, chemical vapor deposition/infiltration, precursor impregnation, and the like. The catalyst particles can be the first catalyst materials or active metals (i.e., second catalyst materials) that are mentioned above. The relative amounts of catalyst particles to first catalyst materials may vary, but is preferably about 0.5 to 5 vol. %.

As mentioned above, the cathode 13 may optionally comprise the graded composition layer 22 adjacent the catalyst layer 21. The graded composition layer may preferably comprise an electrolyte material and a non-electrolyte material selected from $ABO_{3\pm d}$, $A_2B_2O_{5\pm d}$, and $C_2D_2O_{7\pm d}$ as described above. The electrolyte material provides ionic conduction, and the non-electrolyte material provides electronic conduction and catalytic activity to the cathode 13. The graded composition layer 22 is generally characterized by a graded electronic conductivity and a graded ionic conductivity.

The graded electronic conductivity preferably increases from a bottom surface 23 to a top surface 24 of the graded composition layer 22 where the bottom surface 23 is that surface immediately adjacent the catalyst layer 21. In contrast, the graded ionic conductivity preferably decreases from the bottom surface 23 to the top surface 24 of the graded composition layer 22. It is preferred to have the graded composition layer 22 ranging from nearly pure (about 70 to 100%) electronic conductor at the top surface 24 to mainly (about 50 to 70%) ionic conductor at the bottom surface 23 . This may be achieved by incorporating a graded structure of the electrolyte and the non-electrolyte materials.

For example, a graded composition layer 22 could include a 2:1 ratio of electrolyte material/non-electrolyte material near the bottom surface 23, a 1:2 ratio near the top surface 24, and a 1:1 ratio at an area intermediate the bottom and top surfaces 23 and 24, such as in the middle. This can be achieved by forming layers of material, such as by spraying, casting or laminating multiple layers, or deposition. As a further example, the top surface 24 may comprise no more than about 50% of the electrolyte material, and the bottom surface 23 may comprise no more than about 50% of the non-electrolyte material. The foregoing allows for better conduction paths, making the cathode 13 more efficient, and also minimizes a thermal expansion coefficient mismatch between electrolyte and non-electrolyte materials and interconnects.

In general, the graded composition layer 22 can have a typical thickness of at least about 2 $\mu$m and, more typically, between about 50 to 70 $\mu$m. Similar to the above composition grading, a porosity structure of the cathode 13 could also be graded to improve access of oxidant and decrease any losses due to gas concentration gradients.

It should be understood, of course, that the foregoing relates to preferred embodiments of the invention and that modifications may be made without departing from the spirit and scope of the invention as set forth in the following claims.

We claim:

1. A solid oxide fuel cell, comprising:

an anode;

an electrolyte adjacent said anode; and a cathode adjacent said electrolyte, said cathode comprising a conductive layer adjacent said electrolyte;

a catalyst layer adjacent said conductive layer; and a graded composition layer adjacent said catalyst layer.

2. The solid oxide fuel cell of claim 1, wherein said conductive layer comprises a material selected from the group consisting of $ABO_{3\pm d}$, $A_2B_2O_{5\pm d}$, and $C_2D_2O_{7\pm d}$ wherein A is one or more of rare earth metals of Ca, Sr, Mg, and Ba; B is a transition metal; C is one or more of rare earth metals; D is one or more tetravalent ions; and d is a number from 0 to 1.

3. The solid oxide fuel cell of claim 1, wherein said catalyst layer comprises a material selected from the group consisting of $ABO_{3\pm d}$, $A_2B_2O_{5\pm d}$, and $C_2D_2O_{7\pm d}$ wherein A is one or more of rare earth metals of Ca, Sr, Mg, and Ba; B is a transition metal; C is one or more of rare earth metals; D is one or more tetravalent ions; and d is a number from 0 to 1.

4. The solid oxide fuel cell of claim 3, wherein said catalyst layer comprises a second material selected from the group consisting of Pt, Pd, Ru, Rh, and transition ions.

5. The solid oxide fuel cell of claim 1, wherein said graded composition layer comprises an electrolyte material and a non-electrolyte material selected from the group consisting of $ABO_{3\pm d}$, $A_2B_2O_{5\pm d}$, and $C_2D_2O_{7\pm d}$ wherein A is one or more of rare earth metals of Ca, Sr, Mg, and Ba; B is a transition metal; C is one or more of rare earth metals; D is one or more tetravalent ions; and d is a number from 0 to 1.

6. The solid oxide fuel cell of claim 1, wherein said graded composition layer is characterized by a graded electronic conductivity.

7. The solid oxide fuel cell of claim 1, wherein said graded composition layer is characterized by a graded ionic conductivity.

8. The solid oxide fuel cell of claim 1, wherein said catalyst layer is disposed between said conductive layer and graded composition layer.

9. In a solid oxide fuel cell, a cathode comprising:

a conductive layer having a first density;

a catalyst layer having a second density that is less than said first density; and a graded composition layer characterized by a graded electronic conductivity and a graded ionic conductivity.

10. The cathode of claim 9, wherein said cathode is characterized by an area-specific resistance (ASR) of less than about 0.35 ohm-cm$^2$ at 600° C.

11. The cathode of claim 9, wherein said first density is greater than about 80% of theoretical.

12. The cathode of claim 9, wherein said second density is less than about 75% of theoretical.

13. The cathode of claim 9, wherein said conductive layer has a thickness between about 0.1 to 1 $\mu$m.

14. The cathode of claim 9, wherein said catalyst layer has a thickness between about 1 to 2 $\mu$m.

15. The cathode of claim 9, wherein said graded composition layer has a thickness of at least about 2 $\mu$m.

16. The cathode of claim 9, wherein said graded electronic conductivity increases from a bottom surface to a top surface of said graded composition layer.

17. The cathode of claim 16, wherein said bottom surface is adjacent said catalyst layer.

18. The cathode of claim 9, wherein said graded ionic conductivity decreases from a bottom surface to a top surface of said graded composition layer.

19. A method of making a cathode for a solid oxide fuel cell, comprising:

producing a conductive layer having a first density;

producing a catalyst layer having a second density that is less than said first density, said catalyst layer being adjacent said conductive layer;

producing a graded electronic conductivity in a graded composition layer adjacent said catalyst layer; and producing a graded ionic conductivity in said graded composition layer adjacent said catalyst layer.

20. The method of claim 19, wherein said conductive layer comprises a material selected from the group consisting $ABO_{3\pm d}$, $A_2B_2O_{5\pm d}$, and $C_2D_2O_{7\pm d}$ wherein A is one or more of rare earth metals of Ca, Sr, Mg, and Ba; B is a transition metal; C is one or more of rare earth metals; D is one or more tetravalent ions; and d is a number from 0 to 1.

21. The method of claim 19, wherein said catalyst layer comprises a material selected from the group consisting of $ABO_{3\pm d}$, $A_2B_2O_{5\pm d}$, and $C_2D_2O_{7\pm d}$ wherein A is one or more of rare earth metals of Ca, Sr, Mg, and Ba; B is a transition metal; C is one or more of rare earth metals; D is one or more tetravalent ions; and d is a number from 0 to 1.

22. The method of claim 19, wherein said catalyst layer comprises a material selected from the group consisting of Pt, Pd, Ru, Rh, and transition metal ions.

23. The method of claim 19, wherein said graded composition layer comprises a material selected from the group consisting of $ABO_{3\pm d}$, $A_2B_2O_{5\pm d}$, and $C_2D_2O_{7\pm d}$ wherein A is one or more of rare earth metals of Ca, Sr, Mg, and Ba; B is a transition metal; C is one or more of rare earth metals; D is one or more tetravalent ions; and d is a number from 0 to 1.

24. The method of claim 19, wherein said graded electronic conductivity increases from a bottom surface to a top surface of said graded composition layer.

25. The method of claim 24, wherein said bottom surface of said graded composition layer is adjacent said catalyst layer.

26. The method of claim 19, wherein said graded ionic conductivity decreases from a bottom surface to a top surface of said graded composition layer.

27. The method of claim 19, further comprising:

permitting electron travel from said graded composition layer and into an electrolyte adjacent said conductive layer.

28. The method of claim 27, further comprising permitting oxygen ion travel from said graded composition layer and into said electrolyte.

29. The method of claim 27, further comprising increasing oxygen reduction reactions on said electrolyte.

30. The method of claim 19, further comprising minimizing a thermal expansion coefficient mismatch between said electrolyte and non-electrolyte materials and interconnects.

* * * * *